Patented Apr. 17, 1923.

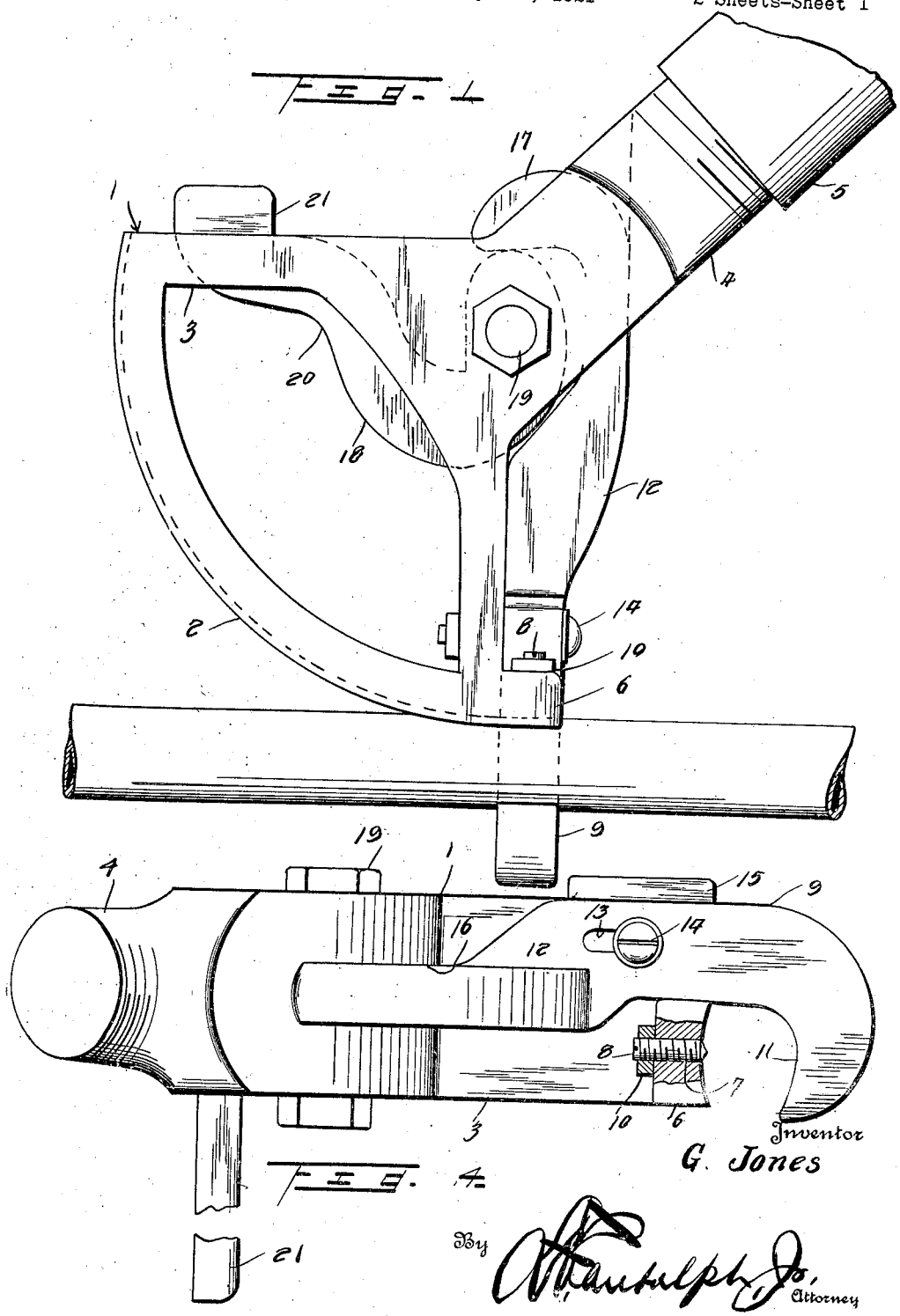

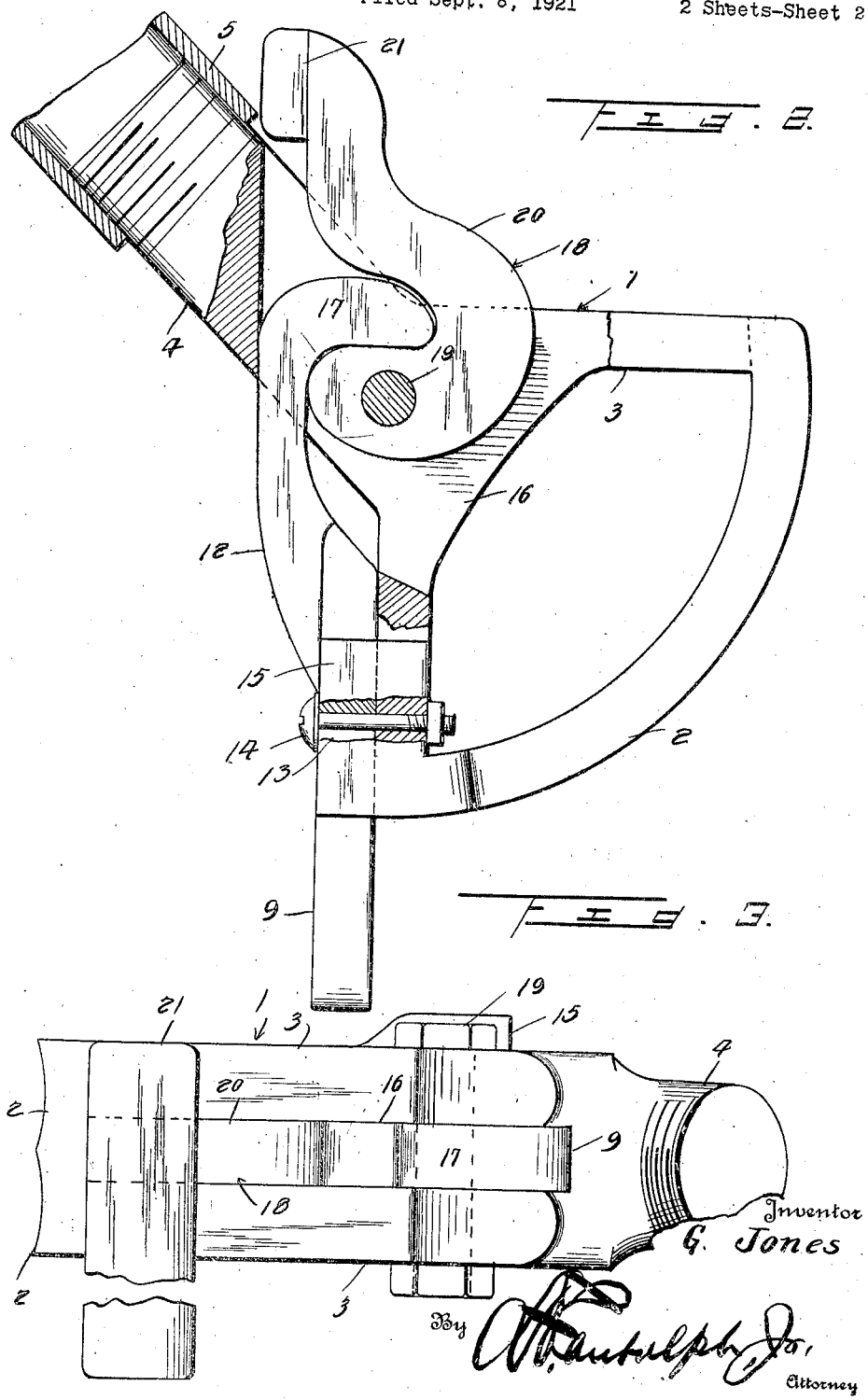

1,452,383

UNITED STATES PATENT OFFICE.

GRAYSON JONES, OF NASHVILLE, TENNESSEE.

PIPE BENDER OR ELBOW FORMER.

Application filed September 8, 1921. Serial No. 499,252.

*To all whom it may concern:*

Be it known that I, GRAYSON JONES, a citizen of the United States, residing at Nashville, in the county of Davidson and State of Tennessee, have invented certain new and useful Improvements in Pipe Benders or Elbow Formers; and I do hereby declare the following to be a full, clear, and exact description of the invention, such as will enable others skilled in the art to which it appertains to make and use the same.

This invention relates to new and useful improvements in pipe benders or elbow formers and has for its primary object the provision of a device that is portable and may be used anywhere a rest or support can be had for a pipe and thereby obviate the loss of time in carrying the pipes back and forth to a bender that requires a bench or support for its operation and also permits the workman to carry the same with him while working, and be equipped to bend a pipe when necessary.

Another object of this invention is the provision of means for locking the device to a straight pipe at any desired point on the latter to permit bending of said pipe at the desired point and with the desired length of elbow or bend therein.

A further object of this invention is the provision of a pipe bender or elbow former of the above stated character which will be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation, illustrating a pipe bender constructed in accordance with my invention and applied to a pipe, Figure 2 is a vertical sectional view, illustrating the device and showing the parts positioned to remove or apply the bender to a pipe, Figure 3 is an end view illustrating the device, Figure 4 is a similar view partly in section illustrating the other end of the device.

Referring in detail to the drawings the numeral 1 indicates a skeleton body which is shaped to form an arcuate active face 2 and converging ends 3.

The ends of the body form onto each other to provide an apex which is extended to form a handle shank 4, the extremity of which is externally screw threaded to have a hollow internally screw threaded handle 5 threaded thereto for the purpose of giving the device the necessary leverage to bend the pipe when applied thereto. One end of the active face 2 is extended beyond one of the ends 3 to form a stationary jaw 6 which is provided with a screw threaded opening 7 to receive a pointed screw threaded stud 8 adapted to project slightly beyond the active face of the jaw for the purpose of biting into the pipe when the latter is forced against the same by a movable jaw 9. The set screw or stud 8 is provided with a lock nut 10 for the purpose of holding the former in any of its adjusted positions. The movable jaw 9 is disposed opposite to the stationary jaw 6 and has its active face curved as illustrated at 11 and the active face of the stationary jaw is also transversely curved. The active face of the body 2 is curved to correspond with the curvature of the stationary jaw, thereby forming an efficient seat for the pipe to engage. The pipe is held into engagement with the stationary jaw 6 by the movable jaw 9 which is formed integrally with a shank 12 and the latter is provided with a slot 13 through which a set screw 14 extends. The set screw is carried by one of the ends of the body and extends through said body and has a nut turned thereon. The body has formed thereon a flange 15 which cooperates with one edge of the stationary jaw 6 in guiding the shank of the movable jaw on the body. The end portions 3 of the body and also the apex and the part of the shank 4 are bifurcated to form a slot 16 and which receives the inner end of the shank 12. The inner end of the shank 12 has formed thereon a hook 17 adapted to be engaged by a cam or eccentric 18 pivoted in the slot of the body by a bolt 19. A curved handle 20 is formed on the cam and provides means whereby the former may be turned in either direction for the purpose of moving the movable jaw towards and from the stationary jaw. When the movable jaw is in clamping position, the handle 20 lies within the slot of one of the end portions of the body. The handle has formed upon its end a transversely extending foot rest 21 whereby the operator may force the handle by his foot in one direction to bring about the clamping of the pipe to the stationary jaw by the movable jaw and also permits the operator to exert force onto the body by the foot when bending the pipe to form an elbow. The operator also pulls upon the handle 5 to cause the bending of the pipe into elbow shape.

The device is applied to a pipe at the desired point and with the latter resting upon the floor, ground or other support, the movable jaw is forced into contact with the pipe by swinging the handle 20 of the cam by the foot being placed on the foot rest 21. With the pipe clamped to the body, the same is swung with the pipe bearing against the active face 2 of the body which causes said pipe to bend into the desired elbow shape. The active face 2 of the body 1 forms an anvil for the pipe to engage and become bent upon.

While I have shown and described the preferred embodiment of my invention, it will be understood that minor changes in construction, combination, and arrangement of parts may be made without departing from the spirit and scope of the invention as claimed.

What is claimed is:—

1. A pipe bender comprising a body having an active face and converging end portions formed integrally with each other and bifurcated to form a slot, a handle for said body, a stationary jaw on said body, a movable jaw slidably secured to the body and having a hook-shaped portion disposed in the slot, a cam pivoted in the slot and engaging the hook-shaped portion of the movable jaw, a curved lever formed on the cam for actuating the movable jaw, said lever adapted to lie normally within the slot.

2. A pipe bender comprising a body having a curved active face and converging end portions formed integrally with each other and bifurcated to form a slot, a stationary jaw on said body, a movable jaw slidably secured to said body, and having a hook-shaped portion received in the slot, a cam journaled in said slot and engaging the hook-shaped portion, a lever formed on said cam, and a foot rest formed on the lever.

3. A pipe bender comprising a body having a curved active face, a stationary jaw at one end of said face, said body having a slot therein, a handle for said body, a shank slidably secured to the body, a movable jaw formed on said shank, a hook portion formed on said shank and received in the slot, a cam journaled in the slot and contacting with the hook-shaped portion, a lever formed on said cam, and a foot rest formed on said lever.

4. A pipe bender comprising a body, a movable jaw carried by said body and slidable thereon, said jaw having a shank provided with a hook, a cam pivoted on said body and engaging with said hook to raise said movable jaw, said cam provided with a shank having a foot rest, and a lever for operating said body.

5. A pipe bender comprising a body, a movable jaw carried by said body and slidable thereon, said jaw having a shank provided with a hook at its end, a cam pivoted on said body and engaging with said hook to raise said movable jaw, said cam provided with a shank, a foot rest on said shank, and a lever for operating said body.

6. A pipe bender comprising a body, a movable jaw carried by said body and slidable thereon, said jaw having a shank provided with a hook, a cam pivoted on said body and engaging with said hook to raise said movable jaw, said cam provided with a shank having a foot rest, a lever for operating said body, and said foot rest being so positioned relative to said body that pressure applied to the foot rest will aid in the bending of the pipe.

In testimony whereof I affix my signature in presence of two witnesses.

GRAYSON JONES.

Witnesses:
J. T. SHANNON,
J. G. MCNISH.